United States Patent [19]

Strunk et al.

[11] 4,411,458
[45] Oct. 25, 1983

[54] STEM SECURING MEANS FOR CONDUITS

[76] Inventors: Norman E. Strunk, 401 McMaster Crescent, Saskatoon, Saskatchewan; Anton P. Pohoreski, Box 100, Asquith, Saskatchewan, both of Canada

[21] Appl. No.: 258,328

[22] Filed: Apr. 28, 1981

[51] Int. Cl.³ .............................................. F16L 5/02
[52] U.S. Cl. ........................... 285/196; 285/DIG. 18; 29/512; 29/523
[58] Field of Search ............... 285/196, 161, 162, 159, 285/338, 207, 208, 220, 222, 194, DIG. 18; 29/512, 523

[56] References Cited

U.S. PATENT DOCUMENTS

| | | | |
|---|---|---|---|
| 980,901 | 1/1911 | Ballantyne | 285/208 |
| 2,398,041 | 4/1946 | Russell | 285/208 |
| 2,813,568 | 11/1957 | Kilmarx | 285/208 X |
| 3,841,667 | 10/1974 | Sands | 285/222 X |

FOREIGN PATENT DOCUMENTS

| | | | |
|---|---|---|---|
| 333727 | 3/1921 | Fed. Rep. of Germany | 285/159 |
| 186445 | 10/1922 | United Kingdom | 285/194 |

*Primary Examiner*—Dave W. Arola
*Attorney, Agent, or Firm*—Brich, Stewart, Kolasch & Birch

[57] ABSTRACT

A stem securing assembly for conduits and a method for its use is provided herein. The conduit, e.g., of polyethylene tubing, is apertured through the wall thereof and a hollow stem to be secured thereto, e.g., for sprinkler heads and the like, is provided with a frusto-conical bulbous base. Preferably, it is provided with a double sloping shouldered base with the diameter of the frusto-conical bulbous base being slightly less than the diameter of the conduit aperture so that the lower end of the hollow stem is insertable through the aperture. A malleably deformable, e.g., resilient, sleeve is positioned to surround the stem and to rest on the frusto-conical bulbous base, or on the second shoulder if both are provided. The assembly so provided is inserted into the aperture. The sleeve has an outside diameter enabling snug insertion of the sleeve into the aperture. A clamping member, e.g., a screw-threaded nut or the like, engages the stem and is urged, e.g., screwed, downwardly just barely to engage the upper end of the sleeve. The upper end of the assembly is then held and the clamping member, e.g., the nut, is tightened downwardly. This expands the sleeve radially outwardly into sealing engagement with the walls of the aperture. In addition, this action draws the hollow stem upwardly so that it slides through the sleeve until the frusto-conical bulbous base is engaged by the sleeve. Further tightening expands the sleeve further radially outwardly by way of the frusto-conical bulbous base. When tightened fully, the hollow stem is held in firm sealing relationship with the aperture through the wall of the conduit, and the lower end of the sleeve, which is within the conduit, is expanded to a diameter greater than the diameter of the aperture.

7 Claims, 8 Drawing Figures

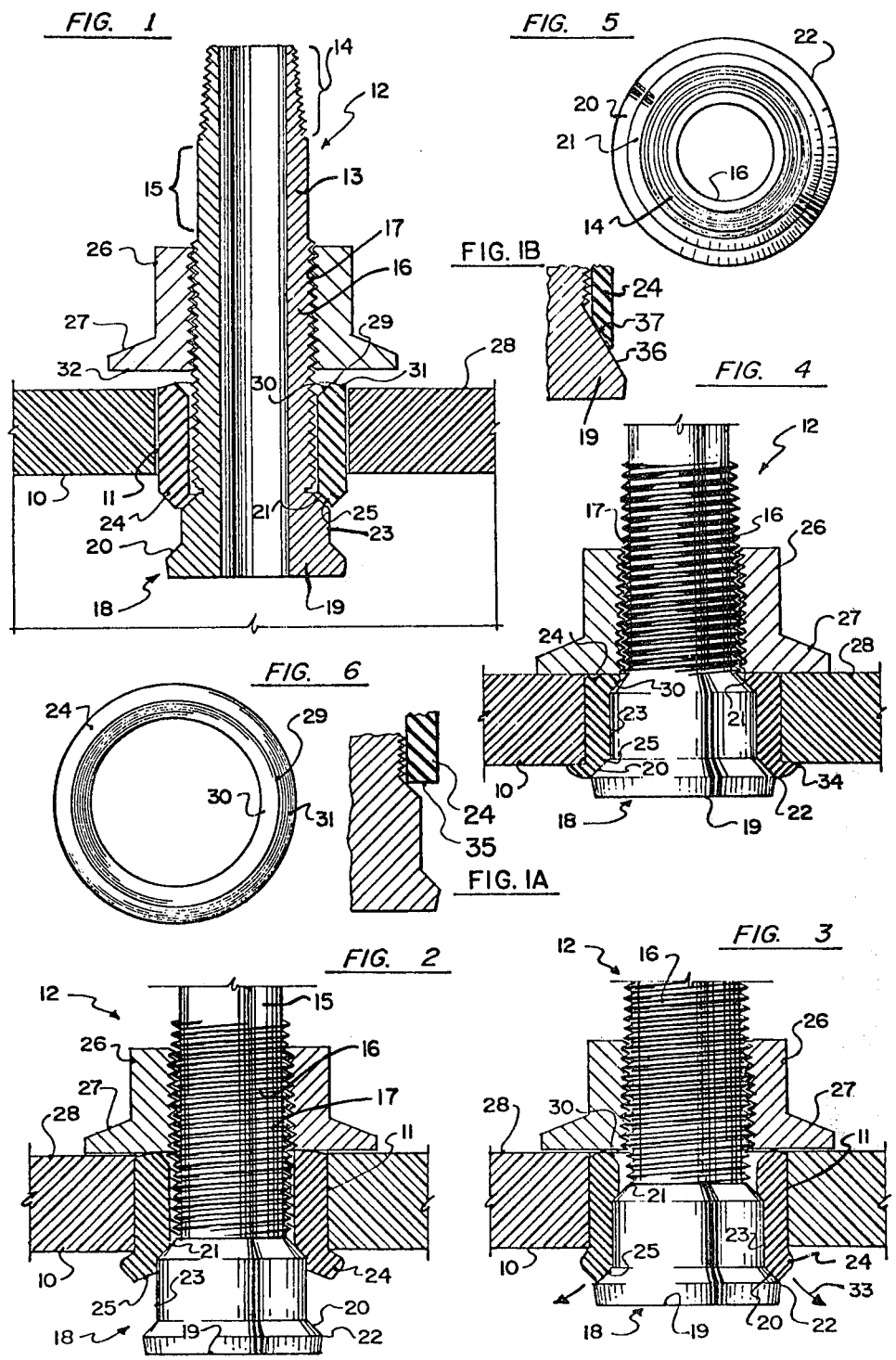

STEM SECURING MEANS FOR CONDUITS

BACKGROUND OF THE INVENTION (i) Field of the Invention

This invention relates to improvements in means to secure cylindrical stems through apertures in the walls of conduits. This invention also provides the combination of the hollow stem and the conduit and a method for securing the hollow stem to the conduit. Although it is designed specifically for use for automatic sprinkler systems, nevertheless it will be appreciated that it can be used in other environments if necessary.

(ii) Description of the Prior Art

Normally, sprinkler system consist of underground conduits with sprinkler heads extending upwardly from the conduit at various locations. These sprinklers heads include a sprinkler tip assembly which is secured within the upper end of a cylindrical stem which in turn is normally screw threadably engageable to a lower cylindrical portion extending through the wall of the underground conduit. Conventionally, the portion of the stem extending from the wall of the conduit is secured through an aperture in the conduit by means of a saddle washer and external clamp assembly (as taught by Canadian Pat. No. 881,191 issued to Gerhard Dyck), because it is not possible normally to engage the conventional stems through the apertures from the inside of the conduit.

The external clamp and saddle washer assemblies described above are awkward and labour intensive to install. The clamps, being underground, and in a damp environment, often corrode unless they are made from a non-corrosive material, under which circumstances the cost is increased.

SUMMARY OF THE INVENTION (i) Aims of the Invention

The present invention intends to provide a stem portion which can be inserted through the aperture in the conduit from the outside and which can then be clamped into position firmly and in sealing relationship with the wall of the conduit.

Another aim of the present invention is to provide an assembly which is particularly suitable for manufacture in plastic, although metal parts can be used.

Yet another aim of the present invention is to provide an assembly which is simple and is economical to manufacture.

(ii) Statement of Invention

The present invention is embodied by an assembly for securing a cylindrical hollow stem to an aperture in the wall of a conduit, the assembly comprising: (a) a malleably deformable sleeve, the sleeve having an outside diameter just slightly smaller than the diameter of the aperture in the wall of the conduit enabling snug insertion of the sleeve through the aperture, and an internal diameter enabling snug passage of a hollow stem therethrough, the sleeve including an internal chamfered upper end and an external chamfered lower end, the length of the sleeve being greater than the thickness of the wall of the conduit; (b) a hollow stem, the stem including a frusto-conical bulbous base, provided at the lower end thereof, the bulbous base being of a larger diameter than the external diameter of the hollow stem but being of slightly less diameter than the diameter of the aperture, the base including a first shoulder at the lower end thereof, the first shoulder sloping upwardly and inwardly towards the portion of the stem which is disposed thereabove, and a second frusto-conical shoulder formed thereon spaced above the first frusto-conical shoulder, the second frusto-conical shoulder sloping inwardly and upwardly toward an upper cylindrical stem portion, the diameter of the upper stem portion being less than the diameter of the stem between the second frusto-conical shoulder and the first frusto-conical shoulder, a portion of the stem immediately above the second shoulder being screw-threaded; and (c) clamping means associated with the hollow stem, the clamping means comprising a screw-threaded cylindrical coupling engageable with the portion of the stem above the frusto-conical base which is screw-threaded, the external diameter of the lower end of the cylindrical coupling being greater than the diameter of the aperture; whereby, when the hollow stem and the sleeve are inserted into the aperture, and when the clamping means are actuated to apply a longitudinal upward force against the base of the sleeve, initial actuation of the clamping means forces the lower end of the sleeve over the second frusto-conical shoulder and down to the frusto-conical base, and the sleeve is expanded radially outwardly into sealing engagement with the wall of the aperture, and simultaneously is forced into longitudinally spaced-apart circumferential sealing engagement with the first and second frusto-conical shoulders.

The invention is also embodied by the combination, with a conduit having an aperture therein, of a cylindrical hollow stem secured to the conduit through the aperture, and a securing assembly comprising: (a) a malleably deformable sleeve, the sleeve having an outside diameter just slightly smaller than the diameter of the aperture in the wall of the conduit enabling snug insertion of the sleeve through the aperture, and an internal diameter enabling snug passage of a hollow stem therethrough, the sleeve including an internal chamfered upper end and an external chamfered lower end, the length of the sleeve being greater than the thickness of the wall of the conduit; (b) a hollow stem, the stem including a frusto-conical bulbous base, provided at the lower end thereof, the bulbous base being of a larger diameter than the external diameter of the hollow stem but being of slightly less diameter than the diameter of the aperture, the base including a first shoulder at the lower thereof, the first shoulder sloping upwardly and inwardly towards the portion of the stem which is disposed thereabove, and a second frusto-conical shoulder formed thereon spaced above the first frusto-conical shoulder, the second frusto-conical shoulder sloping inwardly and upwardly toward an upper cylindrical stem portion, the diameter of the upper stem portion being less than the diameter of the stem between the second frusto-conical shoulder and the first frusto-conical shoulder, a portion of the stem immediately above the second shoulder being screw-threaded; and (c) clamping means associated with the hollow stem, the clamping means comprising a screw-threaded cylindrical coupling engageable with the portion of the stem above the frusto-conical base which is screw-threaded, the external diameter of the lower end of the cylindrical coupling being greater than the diameter of the aperture; the hollow stem and the sleeve having been inserted into the aperture, and the clamping means having been actuated to apply a longitudinal upward force against the base of the sleeve, initial actuation of the clamping means thereby forcing the lower end of the sleeve over the second frusto-conical shoulder and down to the frusto-conical base, and the sleeve being expanded radially outwardly into sealing engagement with the wall of the aperture, and simultaneously is forced into longitudinally spaced-apart circumferential sealing engagement with the first and second frusto-conical shoulders.

This invention is also embodied by a method for securing a cylindrical hollow stem to an aperture in the wall of a conduit, the method comprising: (A) providing a sub-assembly comprising (a) a malleably deformable sleeve, the sleeve having an outside diameter just slightly smaller than the diameter of the aperture in the wall of the conduit enabling snug insertion of the sleeve through the aperture, and an internal diameter enabling snug passage of a hollow stem therethrough, the sleeve including an internal chamfered upper end and an external chamfered lower end, the length of the sleeve being greater than the thickness of the wall of the conduit, (b) a hollow stem, the stem including a frusto-conical bulbous base, provided at the lower end thereof the bulbous base being of a larger diameter than the external diameter of the hollow stem but being of a slightly less diameter than the diameter of the aperture, the base including a first shoulder at the lower end thereof, the first shoulder sloping upwardly and inwardly towards the portion of the stem which is disposed thereabove, and a second frusto-conical shoulder formed thereon spaced above the first frusto-conical shoulder, the second frusto-conical shoulder sloping inwardly and upwardly toward an upper cylindrical stem portion, the diameter of the upper stem portion being less than the diameter of the stem between the second frusto-conical shoulder and the first frusto-conical shoulder, a portion of the stem immediately above the second shoulder being screw-threaded; (B) inserting the sub-assembly into the conduit through the aperture, (C) connecting a clamping means to the hollow stem projecting outwardly from the conduit, the clamping means comprising a screw-threaded cylindrical coupling, threadedly engaged in the portion of the stem above the frusto-conical base which is also being screw-threaded, the external diameter of the lower end of the cylindrical coupling being greater than the diameter of the aperture; and (D) actuating the clamping means by rotating the coupling to apply a longitudinal upward force against the base of the sleeve; whereby the sleeve is expanded radially outwardly into sealing engagement with the wall of the aperture, and simultaneously is forced into longitudinally spaced-apart circumferential sealing engagement with the first and second frusto-conical shoulders.

(iii) Other Features of the Invention

By one feature of the two above described embodiments of this invention, the sleeve is a resilient cylindrical sealing sleeve

BRIEF DESCRIPTION OF THE DRAWINGS

In the accompanying drawings,

FIG. 1 is a fragmentary cross-sectional view of one wall of a conduit with the securing assembly of one embodiment of this invention inserted in the aperture in the conduit ready for clamping engagement;

FIG. 1A is a fragmentary cross-sectional view of one side of the lower part of the stem and base of the embodiment of FIG. 1, showing an alternative shape of the base of the sleeve;

FIG. 1B is a fragmentary cross-sectional view of one side of the lower part of the stem and base similar to the view shown in FIG. 1A but showing an alternative embodiment;

FIG. 2 is a view similar to FIG. 1, but showing the stem partially clamped in position within the aperture in the conduit;

FIG. 3 is a view similar to FIG. 2, but showing the stem firmly clamped in position within the aperture in the conduit;

FIG. 4 is a top plan view of the cylindrical hollow stem per se forming an element of the securing assembly of an embodiment of this invention;

FIG. 5 is a top view of the stem; and

FIG. 6 is a top plan view of the resilient sleeve per se forming an element of the securing assembly of an embodiment of this invention.

DESCRIPTION OF PREFERRED EMBODIMENTS

In the drawings, like characters of reference indicate corresponding parts in different figures.

(i) Description of FIG. 1

As seen in FIG. 1, reference character 10 illustrates in cross-section, one wall of a tubular conduit normally used for the attachment of take-off stems or conduits through circular apertures 11 formed through the wall 10 of the conduit. The conduit is preferably but not essentially made of synthetic plastics material, e.g., polyethylene, but can be made of metal, if so desired.

The stem assembly collectively designated 12 consists of a hollow cylindrical stem 13 having a screw threaded upper end portion 14 to which a sprinkler head assembly (not illustrated) may be screw threadably engaged. Immediately below the upper portion 14 is a plain sided cylindrical portion 15, and immediately therebelow is a main cylindrical portion 16 which, in this embodiment, is partially screw threaded as indicated by reference character 17.

The lower end or base portion 18 is situated at the lower end of the main portion 16 and, in the preferred embodiment, includes a frusto-conical bulbous base 19, including a lower or first sloping annular shoulder portion 20, a cylindrical portion 23 and an upper or second sloping annular shoulder 21 spaced above the frusto-conical shoulder portion 20.

The diameter of the frusto-conical bulbous base 19 is just slightly less than the diameter of the aperture 11 formed in the wall 10 of the conduit so that the stem 12 can be inserted into the aperture, as shown in FIG. 1.

The cylindrical portion 23 between the annular shoulder portion 20 and second shoulder 21 is of a diameter slightly less than the diameter of the frusto-conical bulbous base 19 and the diameter of the screw threaded main cylindrical portion 16 is again slightly less than the diameter of the cylindrical portion 23, all of which is clearly shown in FIG. 1.

A malleably deformable or resilient cylindrical sleeve 24 is provided over the hollow stem 12 and it loosely surrounds the screw threaded main cylindrical portion 16. This cylindrical sleeve may be made of a malleable metal, e.g., lead, or a suitably resilient rubber or plastic, e.g., polyvinyl chloride. It will be noted that sleeve 24 is a relatively loose fit when in position as shown in FIG. 1 so that the assembly is easily inserted through the aperture 11 with the cylindrical sleeve 24 surrounding hollow stem 12 and being positioned within the aperture 11 as clearly shown.

In the embodiment shown in FIG. 1, the lower inner end of the sleeve 24 is chamfered (at 25) with a slope corresponding to the sloping frusto-conical walls of the shoulder portion 20 and the second shoulder 21. It will be observed that this chamfered lower end 25 rests upon the second shoulder 21 when the sub-assembly of hollow stem/sleeve 24 is in the inserting position illustrated in FIG. 1.

Clamping means are provided which cooperate with the hollow stem 12 and above or outside of the wall 10 of the conduit. In this embodiment, the clamping means takes the form of a cylindrical screw threaded coupling sleeve 26 threadably engaged with the threads 17 of the cylindrical portion 16 of the hollow stem 12. Coupling sleeve 26 has an annular flange 27 on the lower end thereof, the flange 27 having a diameter larger than the diameter of the aperture 11 in the wall 10 of the conduit so that, when coupling sleeve 26 is screwed downwardly, it engages the outer surface 28 of the wall 10 of the conduit. However, other forms of clamping devices can be used, e.g., ratchet-type plastic rings or cylinders which are well known in the art and it is, therefore, not believed necessary to illustrate and described same.

It will also be observed that the upper end 29 of the sleeve 24 is chamfered internally (as at 30) and is provided with an outwardly and downwardly sloping wall 31. This facilitates engagement of the sleeves 24 by the under side 32 of the clamping member 26 to initiate the sealing action.

(ii) Description of FIG. 1A

FIG. 1A shows an alternative construction fo the lower end of the sleeve 24 which, in the embodiment, is squared off rather than chamfered, so that the lower end 35 is perpendicular to the longitudinal axis of the sleeve 24. Under certain circumstances, this provides a suitable seal and expansion of the lower end as hereinbefore described.

(iii) Description of FIG. 1B

FIG. 1B also shows the lower end portion of the hollow stem which includes a frusto-conical bulbous base 19 having a sloping shoulder 36 rather than the two sloping shoulders hereinbefore described. In this particular embodiment, the lower end of the sleeve 24 may be chamfered so that it slopes outwardly and downwardly from the inner surface thereof as indicated by reference character 37 or, alternatively, it may be similar to the lower end 35 illustrated in FIG. 1A.

OPERATION OF PREFERRED EMBODIMENT AS SHOWN IN FIGS. 1-4

In operation, the assembly of hollow stem 12/sleeve 24/coupling sleeve 26, as illustrated in FIG. 1, is inserted within the aperture 11 in the wall 10 of the conduit and is held by the upper end 14 thereof. The clamping sleeve 26 is then rotated to be urged downwardly upon the main cylindrical portion 16 until the underside 32 first engages the sleeve 24 and commences to move the sleeve 24 downwardly. The under side 32 then engages the outer surface 28 of the wall 10 of the conduit. Further rotation of the coupling sleeve 26 draws the hollow stem 12 upwardly through the aperture 11 in the wall 10 of the conduit. Because the sleeve 24 cannot move upwardly, the chamfered lower end 25 thereof is urged radially outwardly by the frusto-conical wall of the second shoulder 21. Further upward movement of the hollow stem 12 causes the cylindrical portion 23 of the hollow stem 12 to pass into the sleeve 24 as clearly shown in FIG. 2. The clearance between the sleeve 24, the screw threaded main cylindrical portion 16 of the hollow stem 12 and the aperture 11 in the wall 10 of the conduit permit this movement to take place initially. The sleeve 24 is then further compressed between the hollow stem 12 and the aperture 11 in the wall 10 of the conduit as the sleeve 24 is radially outwardly expanded, thus sealing the hollow stem 12. The clearances are exaggerated in the drawings for clarity.

As the hollow stem 12 is further drawn upwardly through the aperture 11, the lower end of the sleeve 24 finally engages the shoulder portion 20 of the frusto-conical bulbous base 19 with the chamfered inner end 25 nesting upon the sloping wall of the shoulder portion 20, as clearly illustrated in FIG. 3.

Still further upward movement of the hollow stem 12 caused by further rotation of the coupling sleeve 26 forces the lower end of the sleeve 24 to expand further radially outwardly in the direction of arrows 33 which, of course, substantially prevents the frusto-conical bulbous base 19 from being pulled through the aperture. Further tightening of the coupling sleeve 26 therefore clamps the lower end of the sleeve 24 between the sloping shoulder 20 and the inner surface 34 of the wall 10 of the conduit surrounding the aperture 11, thus substantially sealing the hollow stem 12 in position, as well as holding hollow stem 12 firmly in position, as illustrated in FIG. 4.

If necessary, a further sealing ring or washer (not illustrated) may be inserted between the flange 27 of the coupling sleeve 26 and the outer surface of the conduit.

If at any time it is necessary to remove the securing assembly, the coupling sleeve 26 is slackened off and removed, and the sleeve 24 is pulled from around the hollow stem 12, thus enabling the hollow stem 12 to be withdrawn from the aperture 11.

It should be noted that when the coupling sleeve 26 is initially tightened from the position shown in FIG. 1, the upper shoulder 21 centers all of the parts and ensures an even annular fit and positioning of the hollow stem 12 relative to the sleeve 24.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. An assembly for securing a cylindrical hollow stem to an aperture in the wall of a conduit, said assembly comprising:
   (a) a deformable sleeve, said sleeve having an outside diameter just slightly smaller than the diameter of said aperture in the wall of said conduit enabling snug insertion of said sleeve through said aperture, and an internal diameter enabling snug passage of a hollow stem therethrough, said sleeve including an internal chamfered upper end and an external chamfered lower end, the length of said sleeve being greater than the thickness of the wall of said conduit;
   (b) a hollow stem, said stem including a frusto-conical bulbous base, provided at the lower end thereof, said bulbous base being of a larger diameter than the external diameter of said hollow stem but being of slightly less diameter than the diameter of said aperture, said base including a first shoulder at the lower end thereof, said first shoulder sloping upwardly and inwardly towards the portion of said stem which is disposed thereabove, and a second frusto-conical shoulder formed thereon spaced above said first frusto-conical shoulder, said second frusto-conical shoulder sloping inwardly and upwardly toward an upper cylindrical stem portion, the diameter of said upper stem portion and said internal diameter of said sleeve being less than the diameter of the stem between said second frusto-conical shoulder and said first frusto-conical shoulder, a portion of said stem immediately above said second shoulder being screw-threaded; and (c) clamping means associated with said hollow stem, said clamping means comprising a screw-threaded cylindrical coupling engageable with the portion of said stem above said frusto-conical base which is screw-threaded, the external diameter of the lower end of said cylindrical coupling being greater than the diameter of said aperture; whereby, when said hollow stem and said sleeve are inserted into said aperture, and when said clamping means are actuated to apply a longitudinal upward force against the base of said sleeve, initial actuation of said clamping means forces the lower end of said sleeve over said second frusto-conical shoulder and down to said frusto-conical base, and said sleeve is expanded radially outwardly into sealing engagement with the wall of said aperture, and simultaneously is forced into longitudinally spaced-apart circumferential sealing engagement with said first and second frusto-conical shoulders.

2. The assembly of claim 1 wherein said sleeve is a resilient cylindrical sealing sleeve.

3. The assembly of claim 1 wherein said sleeve is a malleable sleeve.

4. In combination with a conduit having an aperture therein, and a cylindrical hollow stem secured to said conduit through said aperture, a securing assembly comprising:

(a) a deformable sleeve, said sleeve having an outside diameter just slightly smaller than the diameter of said aperture in the wall of said conduit enabling snug insertion of said sleeve through said aperture, and an internal diameter enabling snug passage of a hollow stem therethrough, said sleeve including an internal chamfered upper end and an external chamfered lower end, the length of said sleeve being greater than the thickness of the wall of said conduit;

(b) a hollow stem, said stem including a frusto-conical bulbous base, provided at the lower end thereof, said bulbous base being of a larger diameter than the external diameter of said hollow stem but being of slightly less diameter than the diameter of said aperture, said base including a first shoulder at the lower end thereof, said first shoulder sloping upwardly and inwardly towards the portion of said stem which is disposed thereabove, and a second frusto-conical shoulder formed thereon spaced above said first frusto-conical shoulder, said second frusto-conical shoulder sloping inwardly and upwardly toward an upper cylindrical stem portion, the diameter of said upper stem portion and said internal diameter of said sleeve being less than the diameter of the stem between said second frusto-conical shoulder and said frist frusto-conical shoulder, a portion of said stem immediately above said second shoulder being screw-threaded; and (c) clamping means associated with said hollow stem, said clamping means comprising a screw-threaded cylindrical coupling engageable with the portion of said stem above said frusto-conical base which is screw-threaded, the external diameter of the lower end of said cylindrical couping being greater than the diameter of said aperture; said hollow stem and said sleeve having been inserted into said aperture, and said clamping means having been actuated to apply a longitudinal upward force against the base of said sleeve, initial actuation of said clamping means thereby forcing the lower end of said sleeve over said second frusto-conical shoulder and down to said frusto-conical base, and said sleeve being expanded radially outwardly into sealing engagement with the wall of said aperture, and simultaneously is forced into longitudinally spaced-apart circumferential sealing engagement with said first and second frusto-conical shoulders.

5. The combination of claim 4 wherein, in said securing assembly, said sleeve is a resilient cylindrical sealing sleeve.

6. The combination of claim 4 wherein, in said securing assembly, said sleeve is a malleable sleeve.

7. A method of securing a cylindrical hollow stem to an aperture in the wall of a conduit, said method comprising:

(A) providing a sub-assembly comprising (a) a malleably deformable sleeve, said sleeve having an outside diameter just slightly smaller than the diameter of said aperture in the wall of said conduit enabling snug insertion of said sleeve through said aperture, and an internal diameter enabling snug passage of a hollow stem therethrough, said sleeve including an internal chamfered lower end, the length of said sleeve being greater than the thickness of the wall of said conduit, (b) a hollow stem, said stem including a frusto-conical bulbous base, provided at the lower end thereof, said bulbous base being of a larger diameter than the external diameter of said hollow stem but being of slightly less diameter than the diameter of said aperture, said base including a first shoulder at the lower end thereof, said first shoulder sloping upwardly and inwardly towards the portion of said stem which is disposed thereabove, and a second frusto-conical shoulder formed thereon spaced above said first frusto-conical shoulder, said second frusto-conical shoulder sloping inwardly and upwardly toward an upper cylindrical stem portion, the diameter of said upper stem portion and said internal diameter of said sleeve being less than the diameter of the stem between said second frusto-conical shoulder and said first frusto-conical shoulder, a portion of said stem immediately above said second shoulder being screw-threaded;

(B) inserting said sub-assembly into said conduit through said aperture;

(C) connecting a clamping means to the hollow stem projecting outwardly from the conduit, said clamping means comprising a screw-threaded cylindrical coupling, threadedly engaged in said portion of said stem above said frusto-conical base which is also being screw-threaded, the external diameter of the lower end of said cylindrical coupling being greater than the diameter of said aperture; and (D) actuating said clamping means by rotating said coupling to apply a longitudinal upward force against the base of said sleeve;

whereby said sleeve is expanded radially outwardly into sealing engagement with the wall of said aperture, and simultaneously is forced into longitudinally circumferential sealing engagement with said first and second frusto-conical shoulders.

* * * * *